(12) United States Patent
Nikitin et al.

(10) Patent No.: US 12,259,229 B1
(45) Date of Patent: Mar. 25, 2025

(54) LONG RANGE DEPTH ESTIMATION SENSOR

(71) Applicant: Amazon Technologies, Inc., Seattle, WA (US)

(72) Inventors: Sergey M. Nikitin, Cambridge, MA (US); Sara Jean Woo, Andover, MA (US); Jing Ma, Salt Lake City, UT (US)

(73) Assignee: Amazon Technologies, Inc., Seattle, WA (US)

( * ) Notice: Subject to any disclaimer, the term of this patent is extended or adjusted under 35 U.S.C. 154(b) by 346 days.

(21) Appl. No.: 17/745,648

(22) Filed: May 16, 2022

(51) Int. Cl.
*G01B 11/22* (2006.01)
*B25J 9/16* (2006.01)
*G01B 11/25* (2006.01)

(52) U.S. Cl.
CPC .......... *G01B 11/22* (2013.01); *B25J 9/1687* (2013.01); *B25J 9/1697* (2013.01); *G01B 11/2518* (2013.01)

(58) Field of Classification Search
CPC .... G01B 11/22; G01B 11/2518; B25J 9/1687; B25J 9/1697
See application file for complete search history.

(56) References Cited

U.S. PATENT DOCUMENTS

| 2016/0063309 | A1* | 3/2016 | Konolige | G06T 1/0014 901/14 |
| 2017/0024896 | A1* | 1/2017 | Houghton | G06T 7/66 |
| 2022/0050206 | A1* | 2/2022 | Na | G06N 3/044 |
| 2022/0374855 | A1* | 11/2022 | Balaoro | G06Q 20/401 |

* cited by examiner

*Primary Examiner* — Mishawn N. Hunter
(74) *Attorney, Agent, or Firm* — Eversheds Sutherland (US) LLP

(57) ABSTRACT

Systems, techniques, and devices for performing long range depth estimation are described. Multiple images of a scene are captured via at least three imaging sensors of a camera device. A first imaging sensor is separated from a second imaging sensor by a first baseline, and a third imaging sensor is separated from the first imaging sensor by a second baseline larger than the first baseline. A first point cloud is generated based on a first image and a second image captured by the first imaging sensor and the second imaging sensor, respectively. A second point cloud is generated based on the first image and a third image captured by the first imaging sensor and the third imaging sensor, respectively. Depth information of the scene is generated based on the first point cloud and the second point cloud.

20 Claims, 14 Drawing Sheets

LONG RANGE DEPTH ESTIMATION SENSOR

BACKGROUND

The present invention generally relates to imaging systems, and more specifically, to systems, techniques, and apparatus for performing long range depth estimation for robotics handling and manipulation applications, for example.

Retailers, wholesalers, and other product distributors typically maintain an inventory of various items that may be ordered, leased, borrowed, rented, viewed, and so forth, by clients or customers. For example, an e-commerce website may maintain inventory in a fulfillment center. In this example, when a customer orders an item, the item is picked from inventory, routed to a packing station, packed, and shipped to the customer. Facilities may use three-dimensional (3D) sensing technology (or 3D sensing technology) to aid with various applications, including, for example, industrial and factory automation, access control, imaging and navigation, obstacle detection, autonomous robots, augmented reality (AR), virtual reality (VR), etc. In these applications, 3D sensors can be used to determine range or depth information about a target(s) in a scene. Some examples of 3D sensor technology include stereoscopic (or stereo) vision, time-of-flight, light detection and ranging (LIDAR), 3D radar, etc.

BRIEF DESCRIPTION OF DRAWINGS

Various embodiments in accordance with the present disclosure will be described with reference to the drawings, where like designations denote like elements. Note that the appended drawings illustrate typical embodiments and are therefore not to be considered limiting; other equally effective embodiments are contemplated.

DETAILED DESCRIPTION

Figure 1:
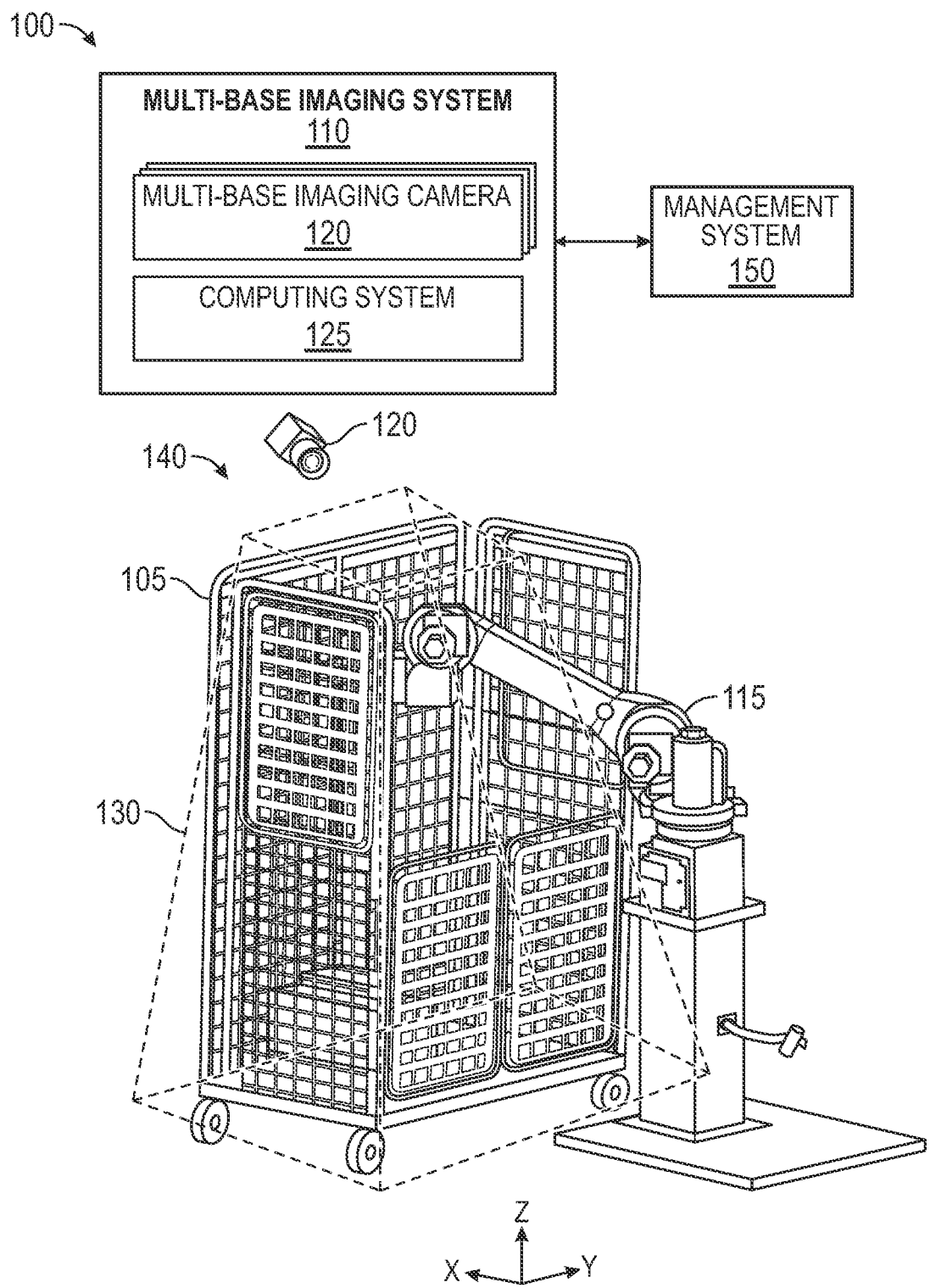
FIG. 1 illustrates an example system, according to one embodiment.

A facility (e.g., shipping warehouse, fulfillment center, etc.) can perform tasks, such as sorting items, picking items, shipping items, storing items, and the like. As an example, an item(s) may be retrieved from storage and transported to a location in preparation for stowing into a container. In another example, an item(s) can be retrieved (or picked) from a container in preparation for shipping. In yet another example, an item(s) can be transitioned via a transport device (e.g., movable cart, conveyor belt, pallet, drive unit, etc.) to a sorting location or a storage location within the facility.

For some tasks, the facility may employ a computer-vision system to process data received from imaging sensors in the facility. In mobility and manipulation robotics applications, for example, the computer-vision system can use a stereo camera(s) to estimate the distance to various objects (e.g., obstacles, items, etc.) within a field-of-view (FOV) of the stereo camera(s). In one particular example, the computer-vision system may use a stereo camera(s) to determine (or estimate) a depth (e.g., vertical distance, horizontal distance, etc.) to one or more object(s) in a location (e.g., transport device, such as a movable cart). In some cases, the computer-vision system can use the depth information (or, more generally, distance information) to determine an amount of space in a location (e.g., transport device) available for placing an item. The available amount of space may be used to control one or more operators (e.g., robotic equipment) used to manipulate items. For example, the operator may be instructed to refrain from placing an item when the amount of space is less than a threshold, instructed to place the item in a particular location based on the available space in that location, etc.

One issue with using conventional stereo camera(s) to perform depth estimation is that the effective scan zone (also referred to herein as a scanning zone) associated with the stereo camera(s) may be limited compared to the field-of-view (FOV) of the stereo camera(s). The scan zone may be 3D region of space (e.g., a volume) within the FOV of the stereo camera(s) in which the depth accuracy of the stereo camera(s) satisfies a predetermined threshold (associated with accurate and reliable depth information from the stereo camera). The scan zone may be defined within any location within the facility, including, for example, a working area (e.g., picking area, sorting area, etc.), a transport device (e.g., movable cart), etc.

With conventional stereo camera(s), the scan zone may be limited due to blind zone(s) associated with the stereo camera(s) and/or poor depth accuracy at large distances (away from the stereo camera(s)). For example, the stereo camera(s) may have a blind zone that includes close distances away from the stereo camera(s), and thus, the stereo camera(s) may not be able to detect depths to objects within these close distances. Additionally, since the stereo camera(s)'s depth accuracy generally decreases with increasing distances, the stereo camera(s) may not be able to detect depths to objects at far distances with sufficient accuracy.

Given the limited scan zone associated with a conventional stereo camera, using such a conventional stereo camera may not be ideal in applications that rely on long range depth estimation with good accuracy (e.g., depth accuracy that satisfies a predetermined threshold). As a reference example, in certain facility locations, the scan zone of the stereo camera may be significantly less than the working volume used within the facility location (e.g., work volume of a movable cart).

As such, embodiments described herein provide systems, apparatus, and techniques for performing long range depth estimation using a multi-base imaging system. In one embodiment described herein, the multi-base imaging system includes at least one multi-base imaging camera, which includes at least three imaging sensors within a single housing. The multi-base imaging camera forms a single unit that can cover a longer range depth of field compared to a conventional stereo camera. For example, a multi-base imaging camera according to one embodiment described herein can include a first imaging sensor, a second imaging sensor, and a third imaging sensor. The first imaging sensor may be separated from the second imaging sensor by a first baseline, and the first imaging sensor may be separated from the third imaging sensor by a second baseline. The second baseline may be larger than the first baseline.

For close distances from the multi-base imaging camera (e.g., a first predetermined range of distances from the multi-base imaging camera), the multi-base imaging system may perform depth estimation using the first imaging camera and the second imaging camera. For larger distances from the multi-base imaging camera (e.g., a second predetermined range of distances from the multi-base imaging camera), the multi-base imaging system may perform depth estimation using the first imaging camera and the third imaging camera.

To achieve a long range depth of field, the multi-base imaging system can obtain a respective image from each of the at least three imaging sensors within the multi-base imaging camera. The multi-base imaging system can generate a first set of point cloud data based on (i) a first image of a scene (captured by the first imaging sensor) and (ii) a second image of the scene (captured by the second imaging sensor). The multi-base imaging system can generate a second set of point cloud data based on (i) the first image of the scene (captured by the first imaging sensor) and (ii) a third image of the scene (captured by the third imaging sensor). The multi-base imaging system may generate depth information associated with the scene, based on the first set of point cloud data and the second set of point cloud data. In one embodiment, for example, the multi-base imaging system may use a stitching algorithm to stitch the first set of point cloud data and the second set of point cloud data together to generate the depth information, which may be in the form of a point cloud in some examples. Compared to depth information generated using a conventional stereo camera, the depth information generated using the techniques described herein may have better depth accuracy and may lead to a significantly larger scan zone.

As used herein, a hyphenated form of a reference numeral refers to a specific instance of an element and the un-hyphenated form of the reference numeral refers to the collective element. Thus, for example, device "12-1" refers to an instance of a device class, which may be referred to collectively as devices "12" and any one of which may be referred to generically as a device "12".

FIG. 1 illustrates an example system 100 with a multi-base imaging system 110, according to one embodiment. The system 100 may be located in an environment, such as a facility (e.g., warehouse, factory, distribution center, fulfillment center, etc.). In one particular embodiment, the system 100 is at least a partially robotic system (e.g., the system 100 may deploy one or more robotic equipment to aid in various tasks). Here, the system 100 includes a workspace 140 (also referred to as a workcell), which may represent an area associated with the facility that is used for one or more facility operations (e.g., sorting, picking, storing, shipping, staging, etc.). For example, the workspace 140 may represent all or part of the floor of a fulfillment center.

The workspace 140 includes a transport device 105 for holding (or storing) items and a robotic arm 115 that can access the transport device 105 to place items into the transport device 105 or retrieve items from the transport device 105. In this embodiment, the transport device 105 is a cart with multiple wheels, which allow the cart to be moved throughout the facility. For example, the transport device 105 may be manually pushed by a user throughout the facility or transported throughout the facility by a drive unit (or autonomous robot).

The transport device 105 also includes multiple panels on each side of the transport device 105. While FIG. 1 depicts the panels as a wire mesh, in other embodiments, the panels may be formed from any suitable material, including, for example, plastic, metal, etc. The panels on each side of the transport device 105 extend upward (e.g., in the z direction), such that a work volume is formed within the transport device 105 for holding one or more items. As shown in FIG. 1, at least one side of the transport device 105 may include panels that can be opened and closed, for example, to allow the robotic arm 115 to access the work volume.

The system 100 also includes a multi-base imaging system 110 and a management system 150, each of which can include hardware components, software components, or combinations thereof. The multi-base imaging system 110 includes one or more multi-base imaging cameras 120 and a computing system 125. Each multi-base imaging camera 120 may include at least one of: (i) at least three imaging sensors, (ii) imaging optics for each of the at least three sensors (e.g., optical lens(es)), or (iii) at least one projector (e.g., infrared (IR) projector). The multi-base imaging camera(s) 120 can be disposed (or placed or fixed) within a given environment (e.g., the workspace 140) in order to create a scan zone in a working area. Here, for example, a multi-base imaging camera 120 is disposed above the transport device 105 and has a FOV 130 that encompasses the work volume of the transport device 105.

The multi-base imaging camera 120 may capture multiple images of a scene (e.g., work volume within the transport device 105). For example, the multi-base imaging camera 120 may capture a respective image from each of the at least three imaging sensors. The computing system 125 may generate a first set of point cloud data, based on (i) a first image from a first imaging sensor and (ii) a second image from a second imaging sensor. The computing system 125 may generate a second set of point cloud data, based on (i) the first image and (ii) a third image from a third imaging sensor. The computing system 125 may generate depth information associated with the scene, based on the first and second sets of point cloud data. Note that the multi-base imaging system 110 is described in greater detail below.

Note that the workspace 140 depicted in FIG. 1 is a reference example of an environment in which the techniques and systems described herein can be deployed and that the techniques and systems described herein can be used in other workspaces. For example, FIGS. 2A-2D illustrate different workspaces 200 A-D, respectively, according to various embodiments. Each of the workspaces 200 A-D may be representative of the workspace 140 depicted in FIG. 1.

Figure 2A:
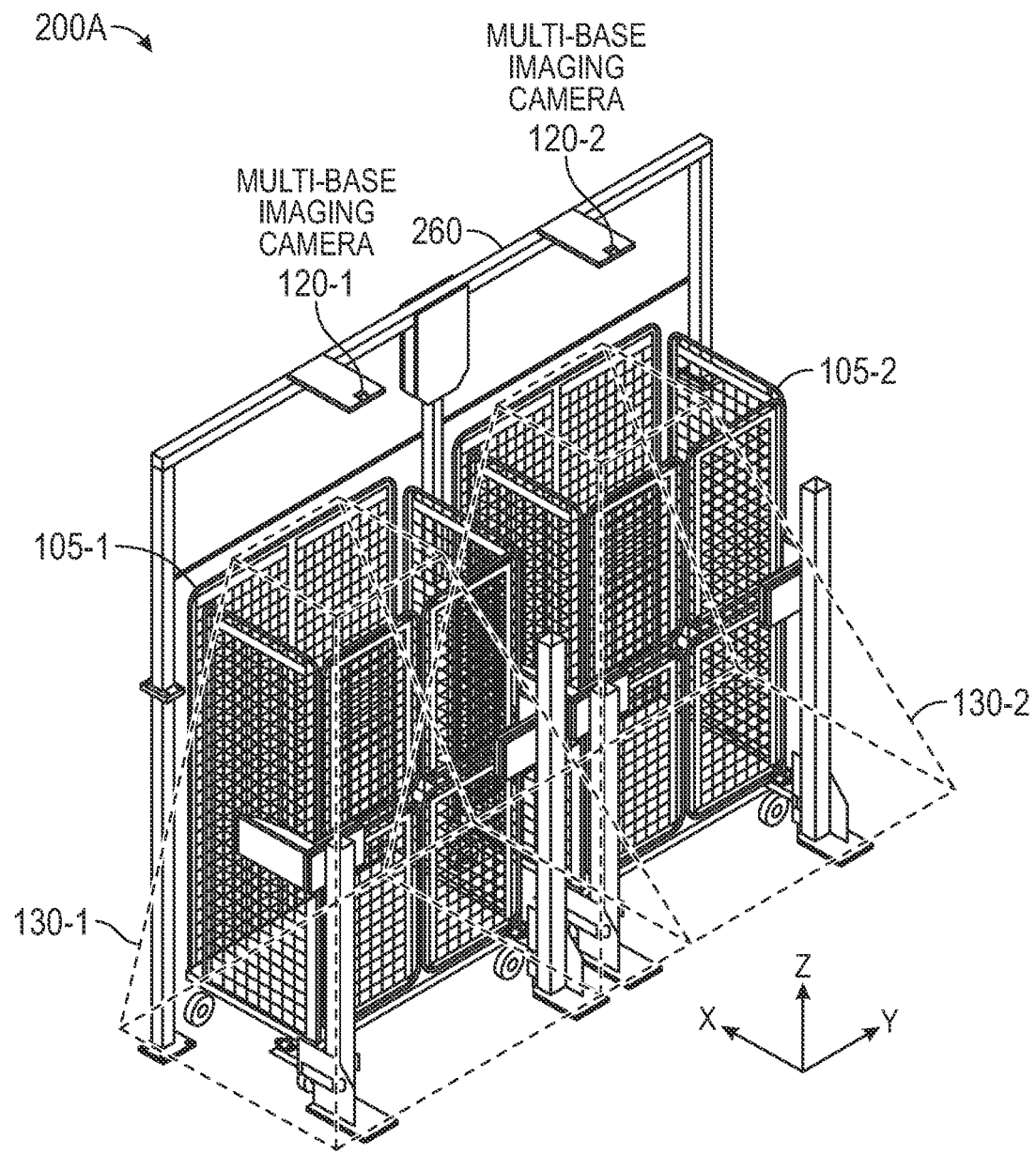
FIGS. 2A-2D illustrate different examples of workspaces within the system of FIG. 1, according to various embodiments.

In FIG. 2A, the workspace 200A includes a transport device 105-1 and a transport device 105-2. In this embodiment, a multi-base imaging camera 120-1 is disposed above the transport device 105-1 and has a FOV 130-1 that encompasses the work volume within the transport device 105-1. Similarly, a multi-base imaging camera 120-2 is disposed above the transport device 105-2 and has a FOV 130-2 that encompasses the work volume within the transport device 105-2. The workspace 100B includes a frame 260, which provides a support structure for the multi-base imaging cameras 120-1 and 120-2. For example, the frame 260 may provide one or more mounting locations for the multi-base imaging cameras 120-1 and 120-2.

Figure 2B:
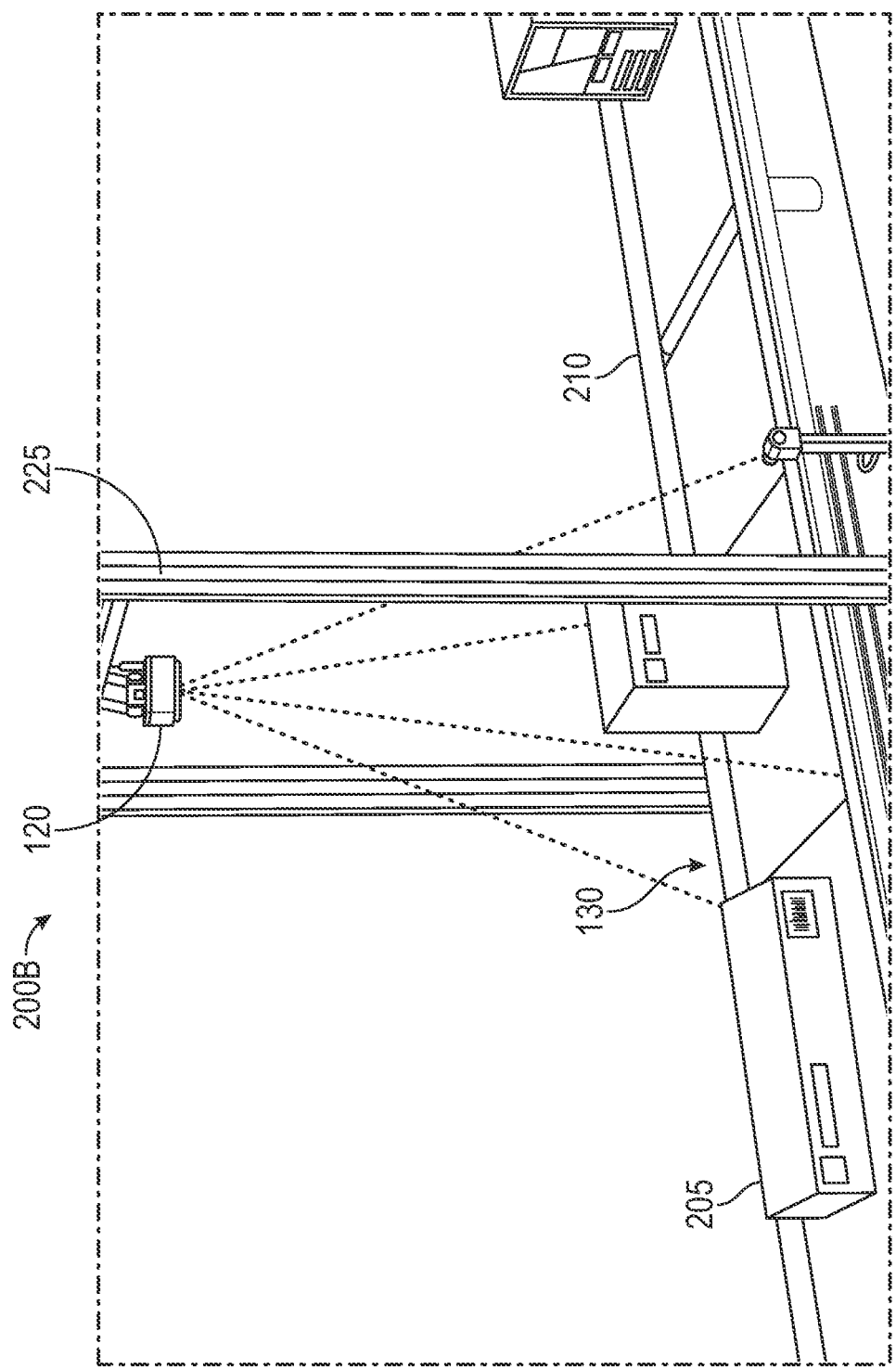

In FIG. 2B, the workspace 200B includes a conveyor 210, which transitions items 205 under a multi-base imaging camera 120. The conveyor 210 may be representative of a transport device 105. The multi-base imaging camera 120 may be supported by a frame 225 (e.g., the frame 225 may have one or more mounting locations for deploying the multi-base imaging camera 120). As shown, as the item(s) 205 transition within the FOV 130 of the multi-base imaging camera 120, the multi-base imaging camera 120 can estimate the depth to the item(s) 205 on the conveyor 210 using the techniques described herein.

Figure 2C:
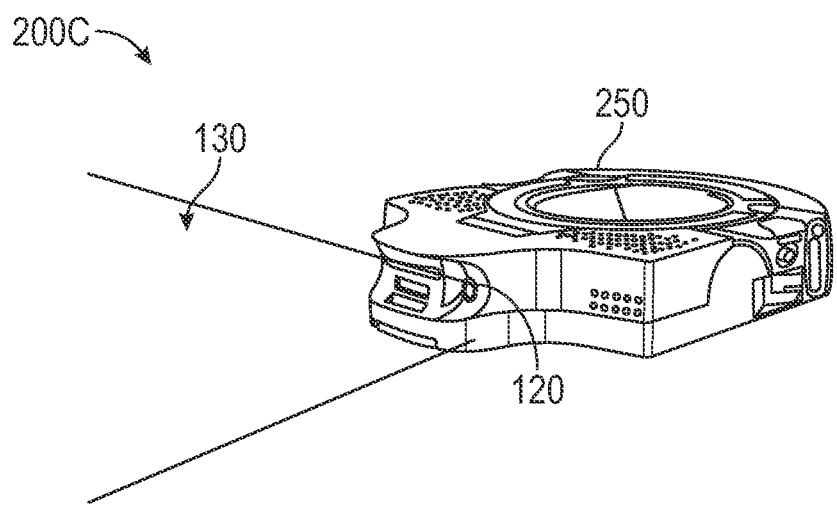
Figure 2D:
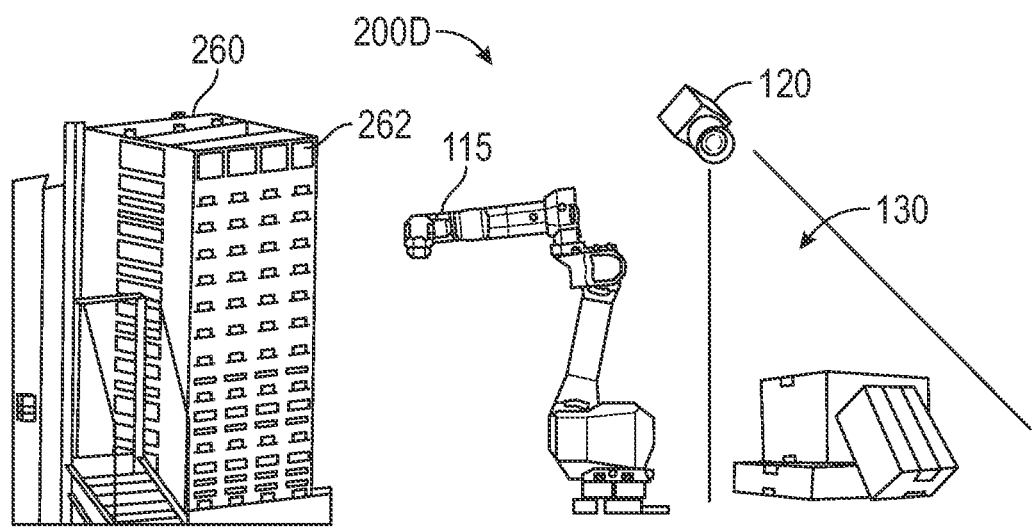

In FIG. 2C, the workspace 200C includes a drive unit 250, which includes a multi-base imaging camera 120. Here, the multi-base imaging camera 120 on the drive unit 250 may be used to navigate within the environment, perform obstacle detection (e.g., detecting items within a FOV 130 of the multi-base imaging camera 120), perform obstacle avoidance (e.g., avoiding items in a path of the drive unit 250), etc. In FIG. 2D, the workspace 200D includes a robotic arm 115 that retrieves item(s) 205 from a holding area and stows the items into container(s) 262 within an inventory holder 260. The workspace 200D also includes a multi-base imaging camera 120 disposed within the workspace 200D. The multi-base imaging camera 120 may have a FOV 130, which includes portions of the holding area (with one or more items 205) as well as the inventory holder 260.

Although FIGS. 1 and 2A-2D show, for the purposes of illustration, embodiments in which the respective workspaces include a fixed, predetermined, and finite physical space, in particular embodiments, the workspaces depicted in FIGS. 1 and 2A-2D may be of variable dimensions and/or of an arbitrary geometry. Similarly, while embodiments described herein primarily describe the workspaces as being entirely enclosed in a building, alternative embodiments may utilize workspaces in which some or all of the workspace is located outdoors, on a vehicle (such as a cargo ship), or otherwise unconstrained by any fixed structure.

Figure 3:
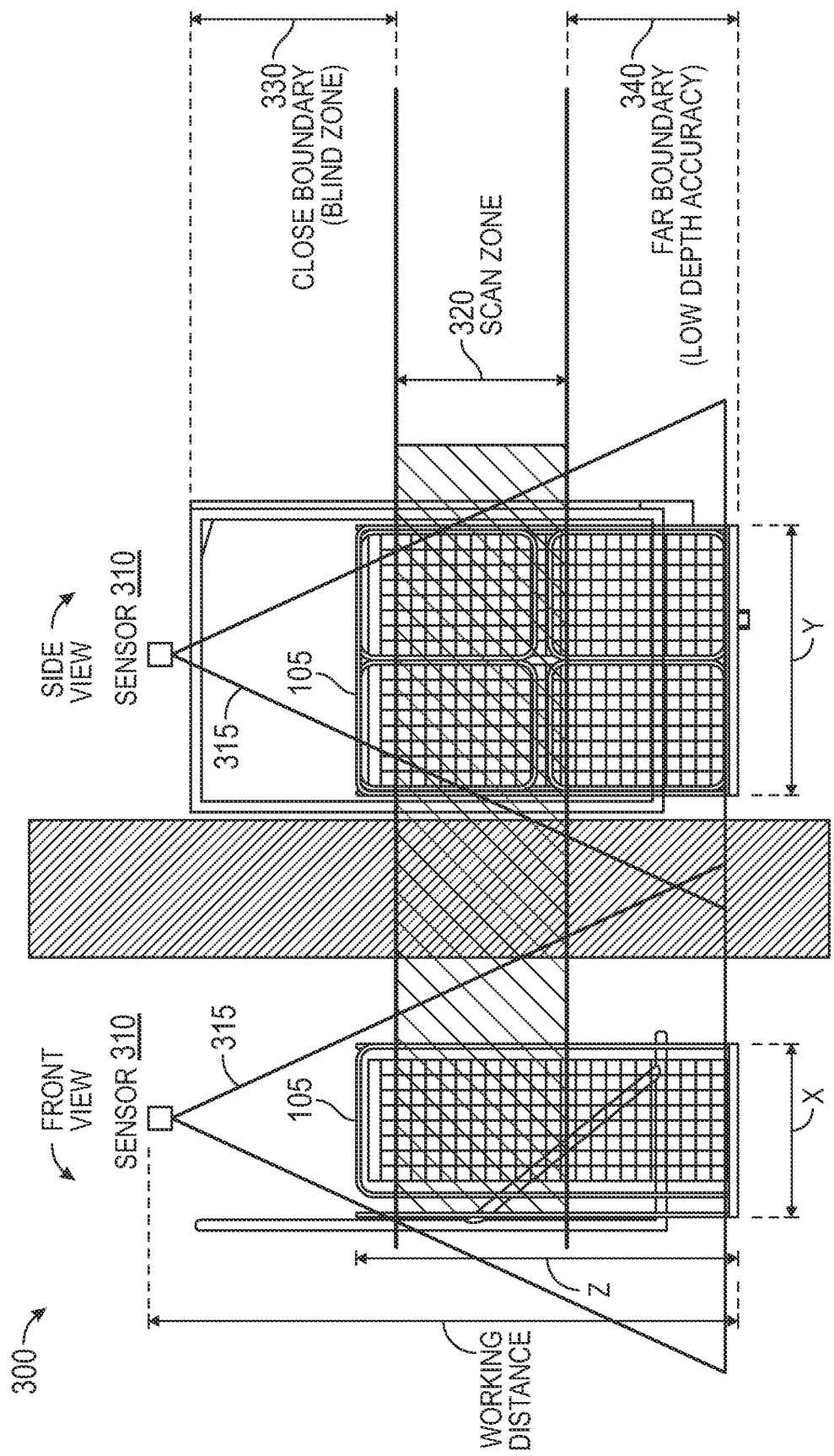
FIG. 3 illustrates an example workspace with a conventional stereo camera system.

FIG. 3 illustrates an example workspace 300 with a conventional stereo camera sensor 310 disposed over the transport device 105. In particular, FIG. 3 depicts a front view of the workspace 300 and a side view of the workspace 300. The stereo camera sensor 310 includes two imaging sensors (or cameras or imagers), separated by a baseline. The stereo camera sensor 310 has a corresponding scan zone 320 defined by a close boundary and a far boundary. For example, the close boundary is based on a blind zone 330, which includes a range of distances from the stereo camera sensor 210 that may not be detected by the stereo camera sensor 310. The far boundary is based on a zone 340, which includes a range of distances from the stereo camera sensor 310 with low depth accuracy (e.g., below a predetermined threshold).

As shown in FIG. 3, due to the close boundary and far boundary, the top and bottom portions of the transport device 105 is outside of the scan zone 320, reducing the ability of the stereo camera sensor 310 to detect depths (with sufficient accuracy) within the top and bottom portions of the transport device 105.

To address this, embodiments describe a multi-base imaging system 110 that can achieve a scan zone with a longer range (relative to the scan zone 320). For example, as described below, the multi-base imaging system 110 can achieve a scan zone that encompasses a substantial amount of the work volume within a transport device 105. In this manner, the multi-base imaging system 110 can perform long range depth estimation for various robotics applications within a facility.

Figure 4:
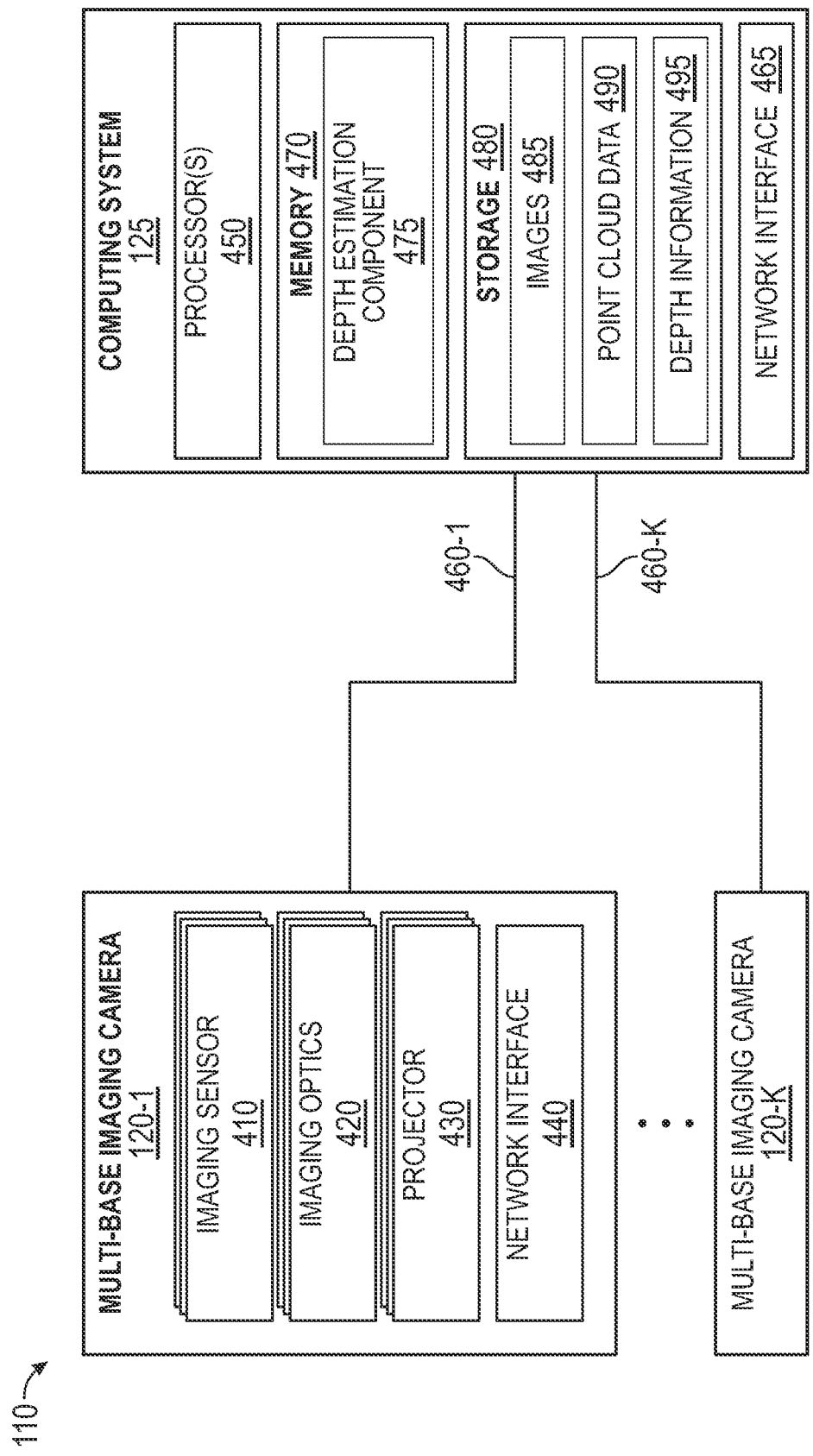
FIG. 4 illustrates components of a multi-base imaging system, according to one embodiment.

FIG. 4 further illustrates components of the multi-base imaging system 110 described relative to FIG. 1, according to one embodiment. As shown, the multi-base imaging system 110 includes multi-base imaging cameras 120 1-K connected to a computing system 125. The multi-base imaging cameras 120 1-K may be connected to the computing system 125 via a wireless or wired network. Here, for example, each multi-base imaging camera 120 is connected to the computing system 125 via respective wired communication links 460 1-K. In one embodiment, the multi-base imaging cameras 120 may communicate with the computing system 125 using a communication protocol, such as Universal Serial Bus (USB) (e.g., USB-3).

Each multi-base imaging camera 120 includes at least three imaging sensors 410, at least three imaging optics 420 (e.g., a respective imaging optic 420 for each imaging sensor 410), at least one projector 430, and a network interface 440. The multi-base imaging camera 120 can capture a respective image of a scene for each of the at least three imaging sensors 410. The imaging sensors 410 are representative of a variety of types of electronic image sensors, including, for example, complementary-metal-oxide-semiconductor (CMOS) image sensors. Additionally, the imaging sensors 410 can include RGB camera sensors or grayscale camera sensors. The imaging sensors 410 may use a rolling shutter or a global shutter. The imaging optic(s) 320 may include various optics, such as an optical lens with a particular focal length.

The projector(s) 430 are generally configured to project a structured light pattern onto a scene. The projector(s) 430 may be an IR projector. In one embodiment, the multi-base imaging camera 120 includes a single projector 430. In another embodiment, the multi-base imaging camera 120 includes multiple projectors 430. In such an embodiment, the multi-base imaging camera 120 can include a first projector 430 that projects a first pattern onto the scene and a second projector 430 that projects a second pattern onto the scene. The network interface 440 can include any communications interface (e.g., serial, wireless, etc.) that allows the multi-base imaging camera 120 to communicate with other computers and/or components in an environment.

The computing system 125 includes a processor(s) 450, a memory 470, a storage 480, and a network interface 465. The processor(s) 450 represents any number of processing elements which can include any number of processing cores. In one embodiment, the processors 450 can include one or more CPUs and/or one or more GPUs. The memory 470 can include volatile memory, non-volatile memory, and combinations thereof. The storage 480 may be a disk drive storage device. Although shown as a single unit, the storage 480 may be a combination of fixed and/or removable storage devices, such as fixed disc drives, removable memory cards, or optical storage, network attached storage (NAS), or a storage area-network (SAN).

In one embodiment, the computing elements (or components) shown in the computing system 125 may correspond to a physical computing system or may correspond to one or more virtual computing instances executing within a computing cloud. Here, the storage 480 includes one or more images 485, point cloud data 490, and depth information 495, described in more detail below. The network interface 465 may be any type of network communications interface (e.g., Ethernet, serial, wireless, etc.) that allows the computing system 125 to communicate with other computers and/or components.

As shown, the memory 470 includes a depth estimation component 475, which can include software, hardware, or combinations thereof. In one embodiment, the depth estimation component 475 may include a software application(s) executing on the computing system 125. For example, the depth estimation component 475 may include software applications that execute one or more computer vision algorithms, which can include, but are not limited to, double disparity algorithms, image alignment algorithms, distortion compensation algorithms, depth/point cloud generation algorithms, stitching algorithms, image registration algorithms, etc. Note the depth estimation component 475 is described in greater detail below.

Note that while FIG. 4 depicts a reference example of the multi-base imaging system 110 and that the multi-base imaging system 110 may have different configurations consistent with the functionality described herein. For example, while FIG. 4 depicts the multi-base imaging camera(s) 120 as being separate from the computing system 125, in some embodiments, one or more multi-base imaging cameras 120 may include one or more components of the computing system 125. In a particular embodiment, a multi-base imaging camera 120 may include processor(s) and memory configured to implement one or more operations of the depth estimation component 475. In this embodiment, instead of sending images (captured by the imaging sensors 410) to a separate computing system 125 to perform long range depth estimation, the multi-base imaging camera 120 may perform the long range depth estimation (e.g., at the multi-base imaging camera 120).

Figure 5:
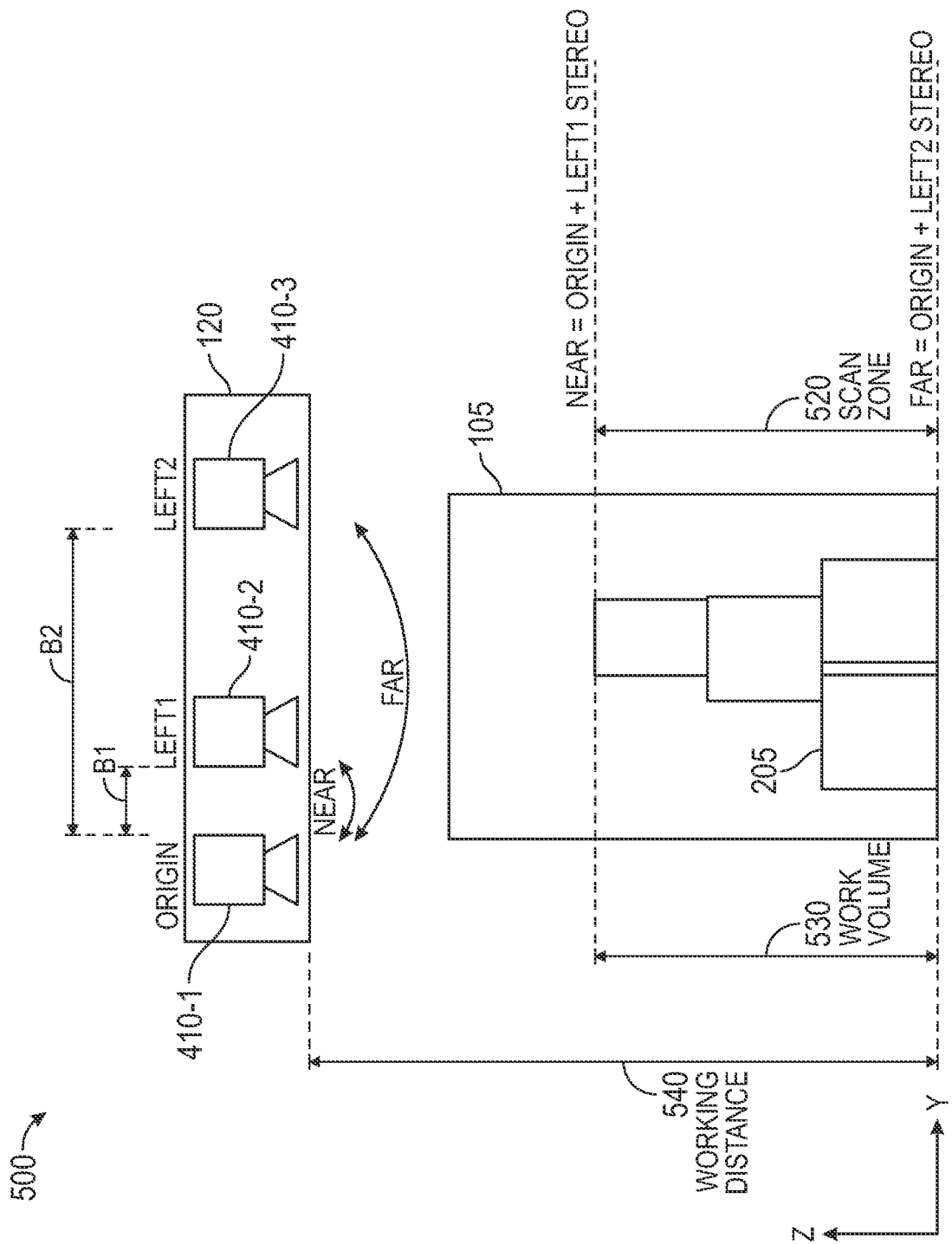
FIG. 5 illustrates an example deployment of a multi-base imaging camera within a workspace, according to one embodiment.

FIG. 5 illustrates an example deployment of a multi-base imaging camera 120 within a workspace 500, according to one embodiment. The workspace 500 includes a transport device 105 with a work volume 500, in which an operator (e.g., robotic arm 115) can place or more items, for example. In this embodiment, the multi-base imaging camera 120 is disposed over the transport device 105 and is configured to estimate a depth to one or more items 205 (or objects) within the transport device 105.

The multi-base imaging camera 120 includes three imaging sensors: imaging sensor 410-1 (also referred to as "origin"), imaging sensor 410-2 (also referred to as "left1"), and imaging sensor 410-3 (also referred to as "left2"). A first base of the multi-base imaging camera 120 includes imaging sensor 410-1 and imaging sensor 410-2, which are separated by a baseline B1. A second base of the multi-base imaging camera 120 includes imaging sensor 410-1 and imaging sensor 410-3, which are separated by a baseline B2. The baseline B2 is larger than the baseline B1. In one embodiment, the baseline B1 is 60 millimeters (mm) and the baseline B2 is 190 mm. As used herein, the imaging sensor 410-1 and the imaging sensor 410-2 may be used as a first stereo camera, and the imaging sensor 410-1 and the imaging sensor 410-2 may be used as a second stereo camera.

For distances within a first predetermined range of distances (e.g., close distances) from the multi-base imaging camera 120, the multi-base imaging camera 120 uses the imaging sensor 410-1 and imaging sensor 410-2 to detect distances to objects within the first predetermined range of distances. For distances within a second predetermined range of distances (e.g., far distances) from the multi-base imaging camera 120, the multi-base imaging camera 120 uses the imaging sensor 410-1 and imaging sensor 410-3 to detect distances to objects within the second predetermined range of distances. In some embodiments, the first predetermined range of distances may at least partially overlap the second predetermined range of distances.

In one embodiment, the scan zone 520 may be achieved by stitching together a first point cloud data set generated from images captured from the first base of the multi-base imaging camera 120 and a second point cloud data set generated from images captured from the second base of the multi-base imaging camera 120. In this manner, embodiments can achieve a scan zone 520 that is significantly larger than the scan zone 320 associated with a conventional stereo camera sensor 310. As shown in FIG. 5, for example, the scan zone 520 encompasses a significant amount of the work volume 530.

In some embodiments, the configuration of the multi-base imaging camera 120 (e.g., baselines, such as B1 and B2) may be based on one or more parameters of the imaging sensors 410 within the multi-base imaging camera 120 and geometry of the workspace 500. The parameters can include, for example, a horizontal resolution, a vertical resolution, a pixel size, a focal length, a root mean square (RMS) of disparity, a FOV, an angular FOV (AFOV), a maximum disparity, etc. The geometry of the workspace 500 may include a working distance (e.g., working distance 540), a target depth RMS (also referred to depth RMS error, depth accuracy or spatial noise) at working distance, a target resolution given the working distance, etc.

In one embodiment, the relationship between the target depth RMS ($\theta_{zrms}$) and baseline (B) may be determined according to the following Equation (1):

$$\sigma_{Zrms} \cong \left(\frac{p}{B*f}\right) * Z_{wd}^2 * \sigma_d \quad (1)$$

where B is the baseline between two imaging sensors 410, $\theta_{zrms}$ is the depth RMS error (spatial noise) at working distance, p is the pixel size of the imaging sensor 410, $Z_{wd}$ is the working distance, f is the focal length of the imaging optics 420 (e.g. a lens), and $\sigma_d$ is the standard deviation of disparity depth noise of the imaging sensor 410 (e.g., at a maximum distance). The minimum depth FOV ($Z_{min}$) (e.g., the minimum measurable depth) of the multi-base imaging camera 120 may be determined according to the following Equation (2):

$$Z_{min} \cong \left(\frac{B*f}{p}\right) * \left(\frac{1}{d_{max}}\right) \quad (2)$$

where $d_{max}$ is the maximal disparity for the imaging sensor 410 (for a target standard deviation). The maximum depth FOV ($Z_{max}$) (e.g., the maximum measurable depth of the multi-base imaging camera 120 for a given standard deviation of depth accuracy $\sigma_{zrms}$ and standard deviation of disparity od may be determined according to the following Equation (3):

$$Z_{max} \cong \sqrt{\left(\frac{B*f}{p}\right) * \left(\frac{\sigma_{Zrms}}{\sigma_d}\right)} \quad (3)$$

Figure 6:
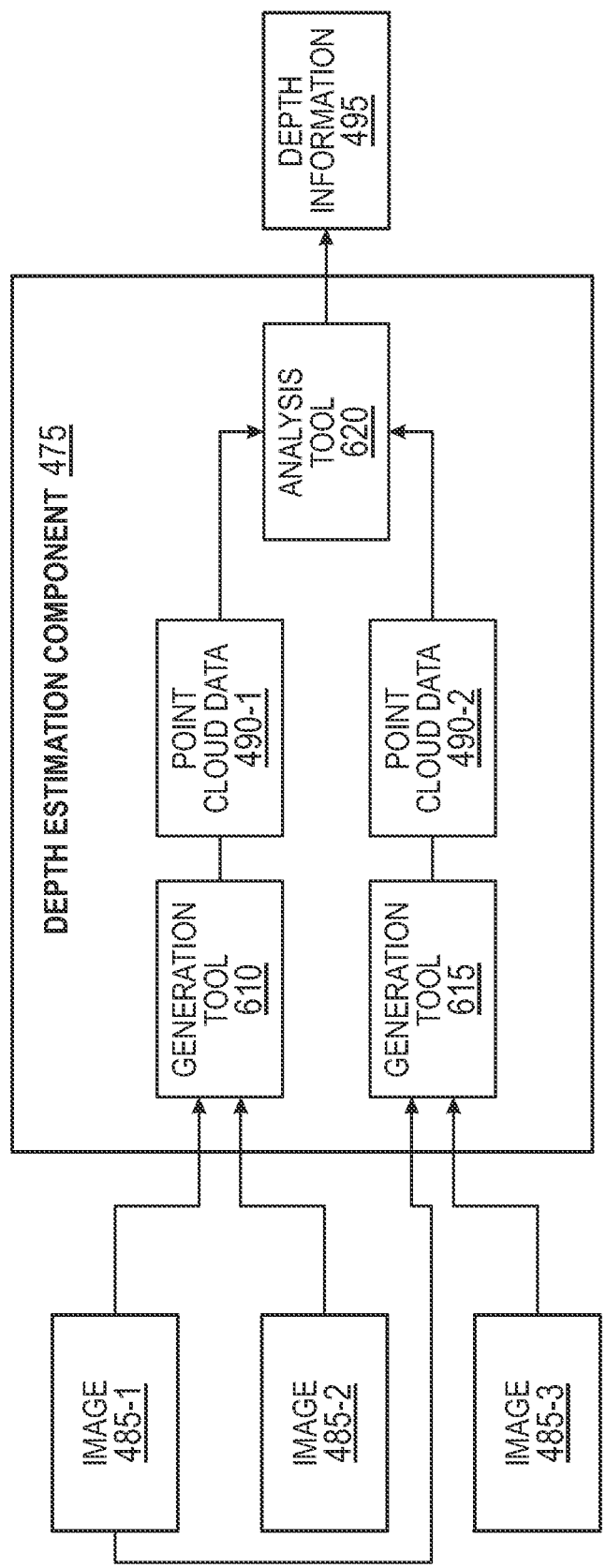
FIG. 6 illustrates components of a depth estimation component, according to one embodiment.

FIG. 6 further illustrates components of the depth estimation component 475, described relative to FIG. 4, according to one embodiment. As shown, the depth estimation component 475 includes a generation tool 610, a generation tool 615, and an analysis tool 620, each of which can include software, hardware, or combinations thereof.

The generation tool 610 receives (i) an image 485-1 of a scene (e.g., transport device 105) captured via a first image sensor 410-1 of a multi-base imaging camera 120 and (ii) an image 485-2 of the scene captured via a second image sensor 410-2 of the multi-base imaging camera 120. The generation tool 610 may evaluate the images 485 1-2 with one or more computer vision algorithms to generate a first set of point cloud data 490-1 for close distances from the multi-base imaging camera 120. In one embodiment, the generation tool 610 can generate a disparity map between the images 485 1-2 using a disparity algorithm and a depth/point cloud based on a depth/point cloud generation algorithm.

Similarly, the generation tool 615 receives (i) the image 485-1 and (ii) an image 485-3 of the scene captured via a third image sensor 410-3 of the multi-base imaging camera 120. The generation tool 615 may evaluate the images 485-1 and 485-3 with one or more computer vision algorithms to generate a second set of point cloud data 490-2 for far distances from the multi-base imaging camera 120. In one embodiment, the generation tool 615 can generate a disparity map between the images 485-1 and 485-3 using a disparity algorithm and a depth/point cloud based on a depth/point cloud generation algorithm.

The analysis tool 620 receives the point cloud data 490-1 and the point cloud data 490-2 and generates depth information 495 based on an evaluation of the point cloud data 490 1-2 with one or more computer vision algorithms. For example, the analysis tool 620 may use a stitching algorithm to stitch the point cloud data 490 1-2. In this example, the depth information 495 may include a stitched (or registered) point cloud that includes distance information for close distances and far distances of the scene. Note that FIG. 6 illustrates a reference example of the depth estimation component 475 and that, in other embodiments, the depth estimation component 475 may have a different configuration consistent with the functionality described herein. For example, the depth estimation component 475 may be implemented with any number of tools/components or combination of tools/components.

Figure 7:
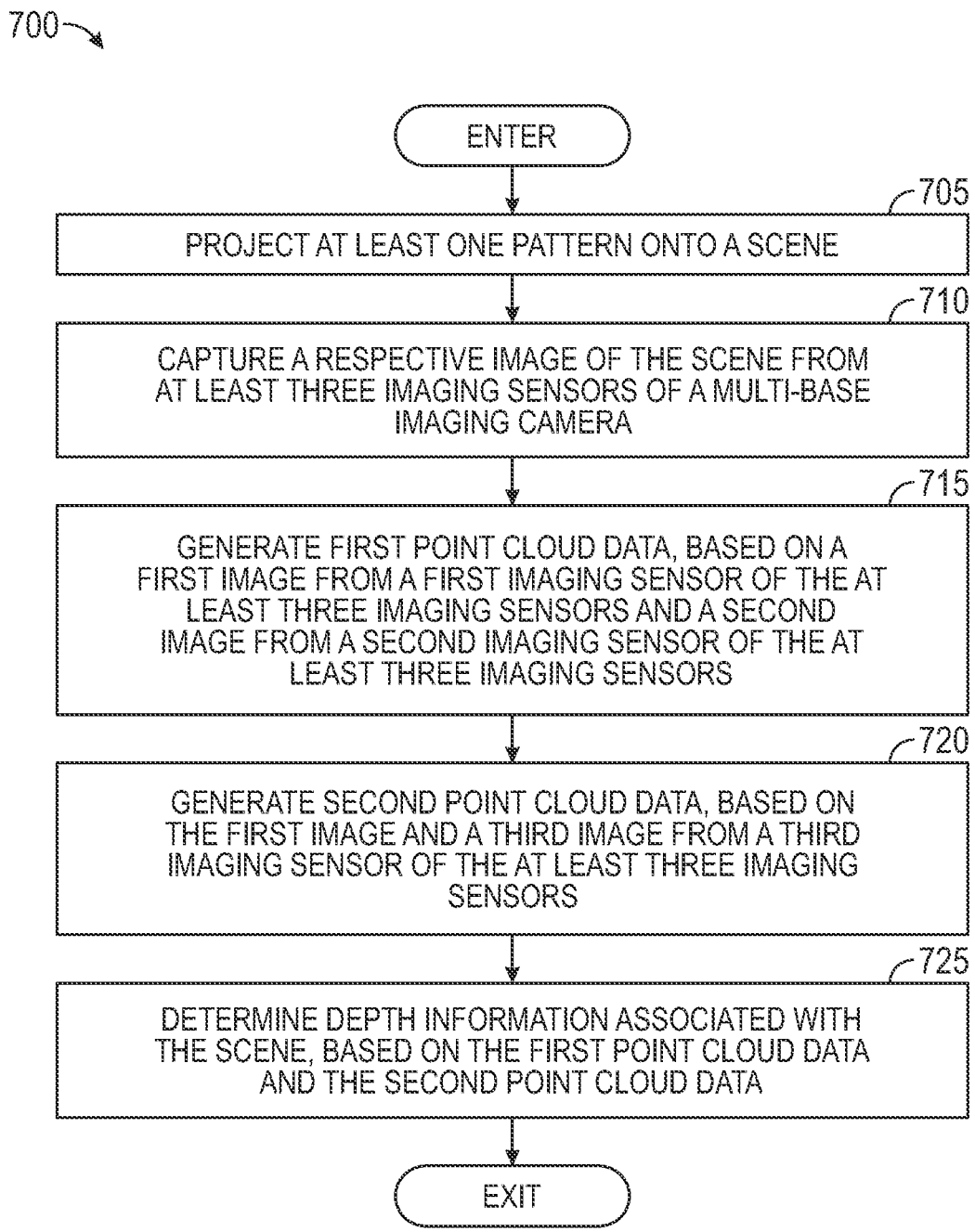
FIG. 7 is a flowchart of a method for performing long range depth estimation, according to one embodiment.

FIG. 7 is a flowchart of a method 700 for performing long range depth estimation of one or more objects in a scene, according to one embodiment. The method 700 may be performed by one or more components of a multi-base imaging system (e.g., multi-base imaging system 110).

Method 700 may enter at block 705, where the multi-base imaging system projects at least one pattern onto a scene, for example, via a projector (e.g., projector 430) of a multi-base imaging camera (e.g., multi-base imaging camera 120). At block 710, the multi-base imaging system captures a respective image of the scene from at least three imaging sensors (e.g., imaging sensors 410) of the multi-base imaging camera.

Figure 8A:
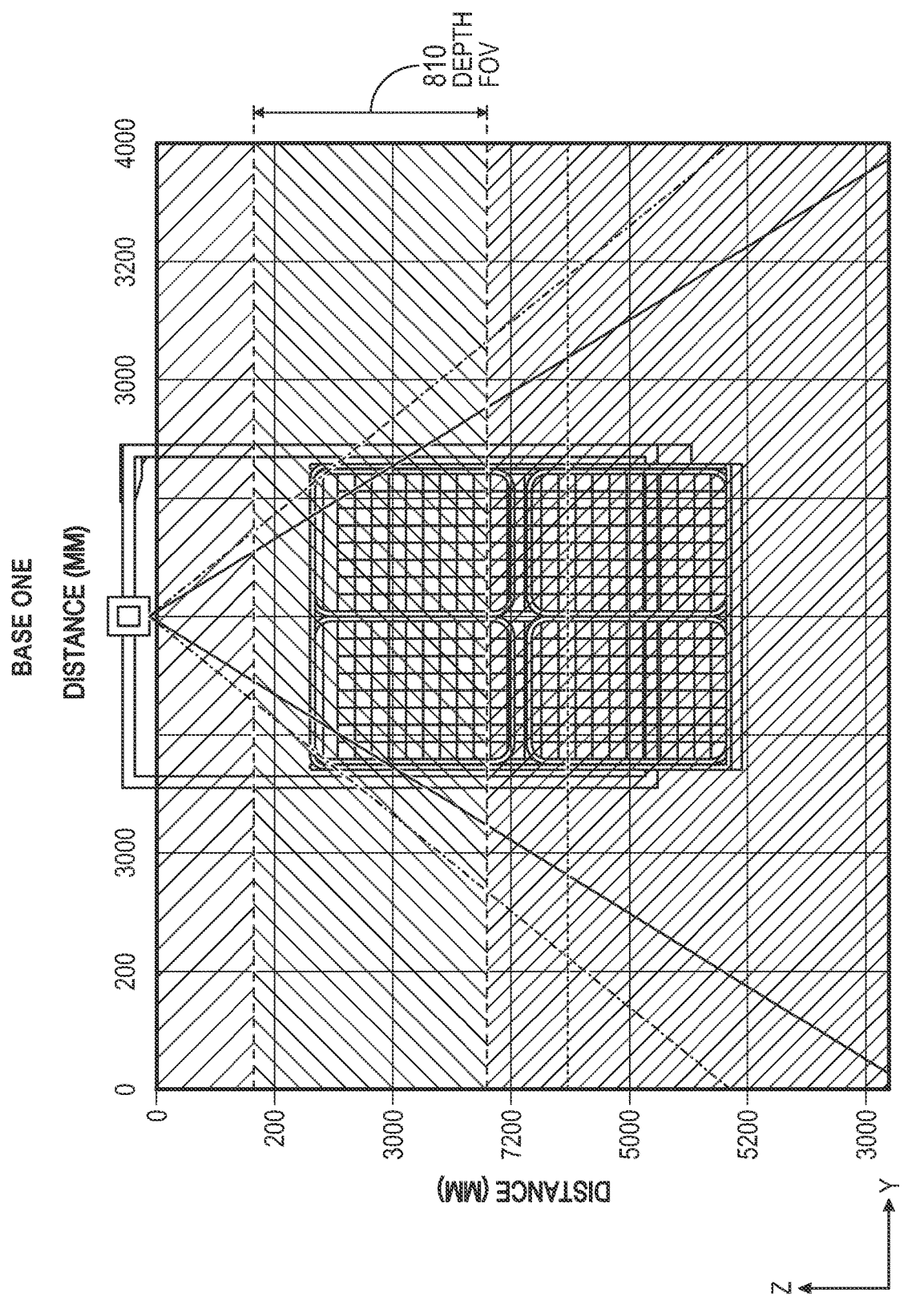
FIG. 8A illustrates an example depth field-of-view of a scene, according to one embodiment.

At block 715, the multi-base imaging system generates first point cloud data (e.g., point cloud data 490-1), based on a first image (e.g., image 485-1) from a first imaging sensor (e.g., imaging sensor 410-1) of the at least three imaging sensors and a second image (e.g., image 485-2) from a second imaging sensor (e.g., imaging sensor 410-2) of the at least three imaging sensors. In one embodiment, the first point cloud data includes distance (depth) information for a first predetermined range of distances (e.g., close distances) from the multi-base imaging camera. By way of example, FIG. 8A illustrates an example of a depth FOV 810 (in the z direction) of the multi-base imaging camera 120 using a first base (origin+left1) of the multi-base imaging camera 120.

Figure 8B:
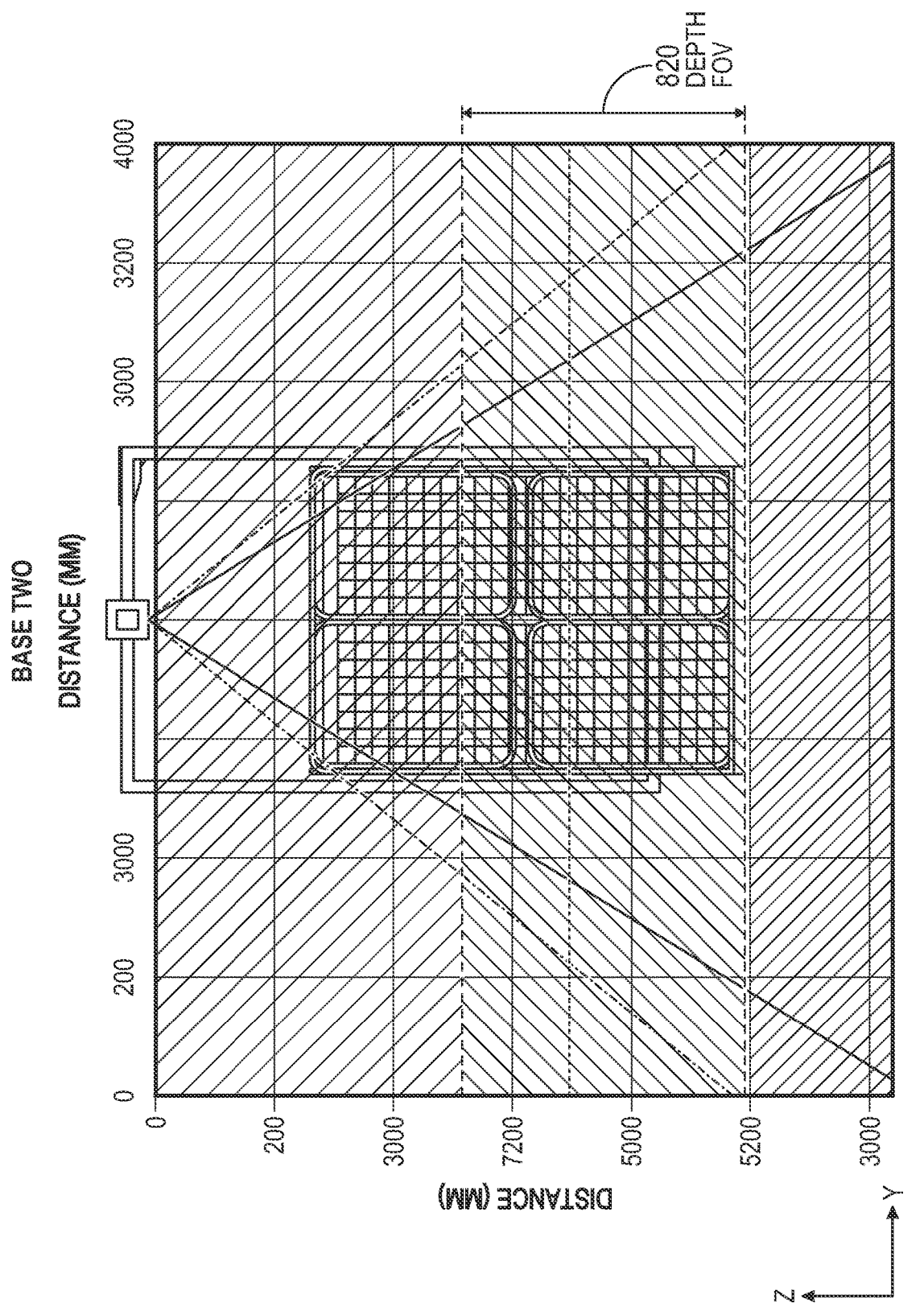
FIG. 8B illustrates another example depth field-of-view of a scene, according to one embodiment.

At block 720, the multi-base imaging system generates second point cloud data (e.g., point cloud data 490-2), based on the first image and a third image (e.g., image 485-3) from a third imaging sensor (e.g., imaging sensor 410-3) of the at least three imaging sensors. In one embodiment, the second point cloud data includes distance (depth) information for a second predetermined range of distances (e.g., far distances) from the multi-base imaging camera. By way of example, FIG. 8B illustrates an example of a depth FOV 820 (in the z direction) of the multi-base imaging camera 120 using a second base (origin+left2) of the multi-base imaging camera 120.

At block 725, the multi-base imaging system determines depth information (e.g., depth information 495) associated with the scene, based on the first point cloud data and the second point cloud data. In one embodiment, the multi-base imaging system may stitch the first point cloud data and the second point cloud data to generate the depth information. For example, the depth information may include a stitched point cloud that includes distance (depth) information for the first and second range of distances. In one embodiment, the depth information may be used to determine distance to objects in the scene, control movement of operators (e.g., robotic arm 115) within the scene, etc. The method 700 may then exit.

Figure 9A:
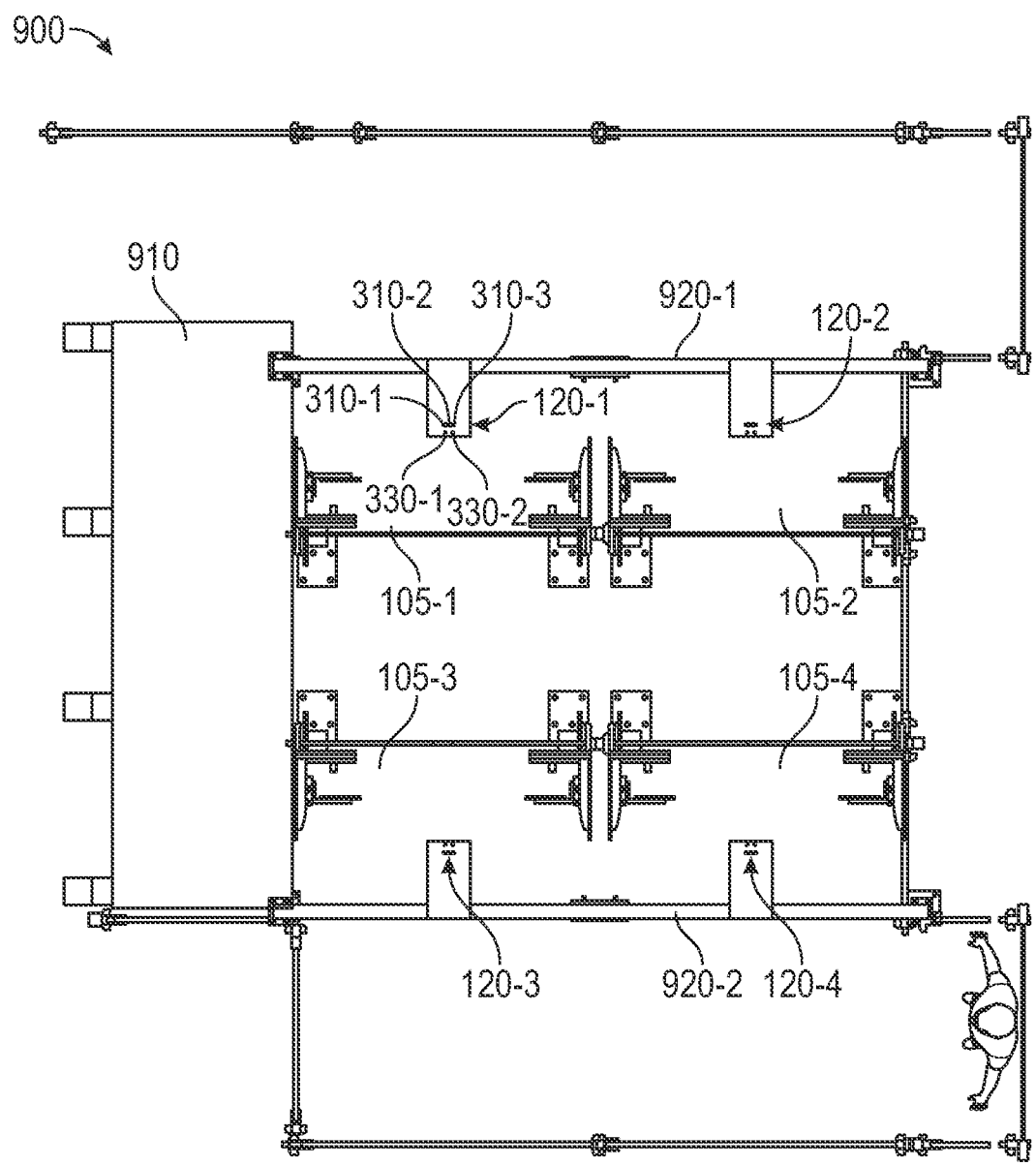
FIG. 9A illustrates a top view of an example workspace, according to one embodiment.
Figure 9B:
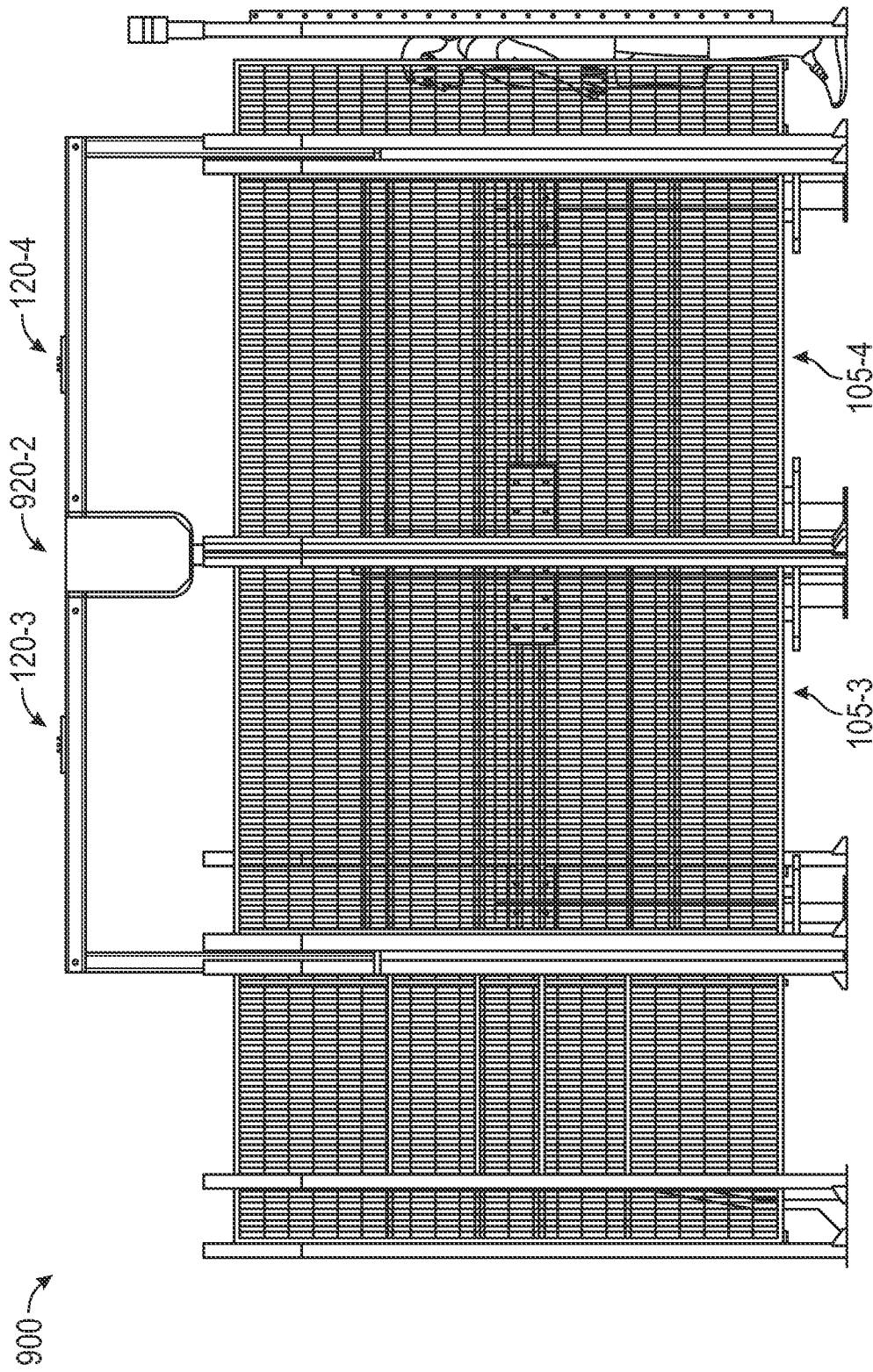
FIG. 9B illustrates a side view of an example workspace, according to one embodiment.
Figure 9C:
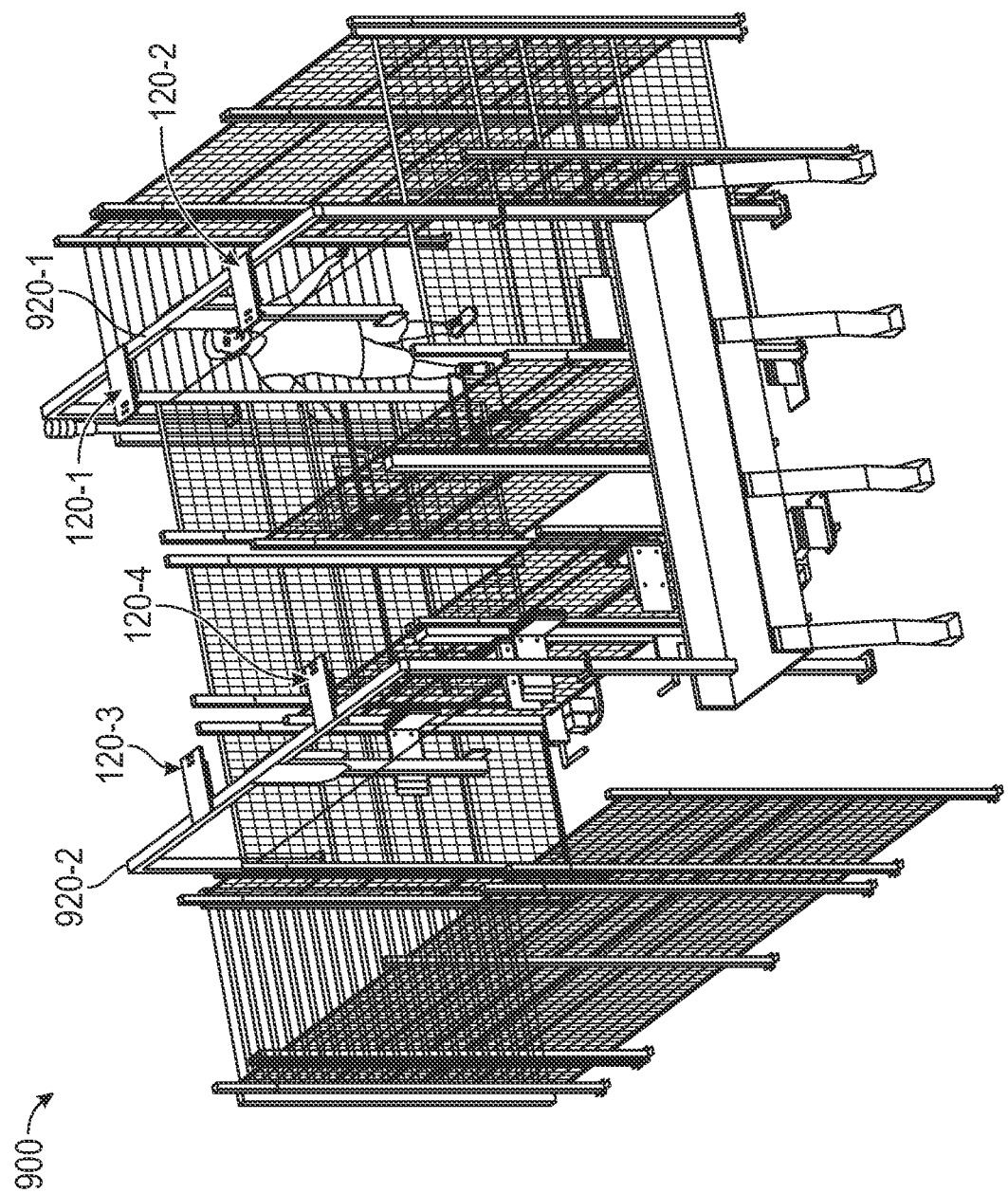
FIG. 9C illustrates a perspective view of an example workspace, according to one embodiment.

FIGS. 9A-9C illustrate different views of an example workspace 900, according to one embodiment. In particular, FIG. 9A illustrates a top view of the workspace 900, FIG. 9B illustrates a side view of the workspace 900, and FIG. 9C illustrates a perspective view of the workspace 900, according to one embodiment. Here, the workspace 900 includes four transport devices 105 1-4, four multi-base imaging cameras 120 1-4, and a conveyor 910.

The multi-base imaging camera 120-1 and multi-base imaging camera 120-2 are disposed over transport device 105-1 and transport device 105-2, respectively. The multi-base imaging cameras 120 1-2 are supported by a frame 920-1. Similarly, the multi-base imaging camera 120-3 and multi-base imaging camera 120-4 are disposed over transport device 105-3 and transport device 105-4, respectively. The multi-base imaging cameras 120 3-4 are supported by a frame 920-2. As shown in FIG. 9A, each multi-base imaging camera 120 includes an imaging sensor 410-1, an imaging sensor 410-2, an imaging sensor 410-3, a projector 430-1 and a projector 430-2.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
    a transport device comprising a volume for holding one or more items;
    a frame providing a mounting location above the transport device;
    a multi-base imaging camera disposed in the mounting location, such that the volume of the transport device is within a field-of-view of the multi-base imaging camera, wherein the multi-base imaging camera comprises:
        a first imaging sensor;
        a second imaging sensor separated from the first imaging sensor by a first baseline; and
        a third imaging sensor separated from the first imaging sensor by a second baseline greater than the first baseline; and
    a computing system configured to:
        capture, via the first imaging sensor, a first image of the volume of the transport device;
        capture, via the second imaging sensor, a second image of the volume of the transport device;
        capture, via the third imaging sensor, a third image of the volume of the transport device;
        generate a first point cloud based on the first image and the second image, the first point cloud comprising first depth information for distances within a first range of distances from the multi-base imaging camera;
        generate a second point cloud based on the first image and the third image, the second point cloud comprising second depth information for distances within a second range of distances from the multi-base imaging camera; and
        generate third depth information, based on the first point cloud and the second point cloud, the third depth information comprising at least the first depth information and the second depth information.

2. The system of claim 1, wherein the multi-base imaging camera comprises a housing comprising the first imaging sensor, the second imaging sensor, and the third imaging sensor.

3. The system of claim 2, wherein the housing further comprises the computing system.

4. The system of claim 1, wherein a scan zone of the multi-base imaging camera is created within the transport device based on the third depth information.

5. The system of claim 4, wherein a depth of the scan zone is greater than or equal to a depth of the volume of the transport device.

6. A computer-implemented method comprising:
    obtaining, via a camera device, a plurality of images of a scene, the plurality of images comprising (i) a first image captured by a first imaging sensor of the camera device, (ii) a second image captured by a second imaging sensor of the camera device, and (iii) a third image captured by a third imaging sensor of the camera device, wherein the first imaging sensor is separated from the second imaging sensor by a first baseline, and the first imaging sensor is separated from the third imaging sensor by a second baseline;
    generating, based on the first image and the second image, a first point cloud comprising first depth information in the scene for a first range of distances from the camera device;
    generating, based on the first image and the third image, a second point cloud comprising second depth information in the scene for a second range of distances from the camera device;
    generating third depth information, based on the first point cloud and the second point cloud; and
    performing one or more robotic operations within the scene, based on the third depth information.

7. The computer-implemented method of claim 6, wherein at least one distance in the first range of distances is less than at least one distance in the second range of distances.

8. The computer-implemented method of claim 6, wherein the scene comprises a transport device comprising a volume for storing one or more items.

9. The computer-implemented method of claim 8, further comprising generating a scan zone within the transport device, wherein performing the one or more robotics operations comprises:
    determining a depth to an object that is within the scan zone;
    determining an amount of space available within the transport device, based at least in part on the depth to the object; and
    controlling a robotic arm to place another object within the transport device, when the amount of space is greater than a threshold.

10. The computer-implemented method of claim 9, wherein a depth of the scan zone is greater than or equal to a depth of the volume within the transport device.

11. The computer-implemented method of claim 6, wherein generating the third depth information comprises generating a third point cloud based on stitching the first point cloud and the second point cloud, via a stitching algorithm.

12. The computer-implemented method of claim 6, wherein:
    generating the first point cloud comprises generating, via a first disparity algorithm, a first disparity map between the first image and the second image; and
    generating the second point cloud comprises generating, via a second disparity algorithm, a second disparity map between the first image and the third image.

13. The computer-implemented method of claim 6, further comprising projecting an infrared (IR) pattern onto the scene via a projector of the camera device, wherein each of the first image, the second image, and the third image comprises at least a portion of the IR pattern.

14. The computer-implemented method of claim 6, further comprising:
    projecting a first infrared (IR) pattern onto the scene via a first projector of the camera device; and
    projecting a second IR pattern onto the scene via a second projector of the camera device.

15. The computer-implemented method of claim 6, wherein each of the first imaging sensor, the second imaging sensor, and the third imaging sensor is an RGB camera sensor.

16. The computer-implemented method of claim 6, wherein each of the first imaging sensor, the second imaging sensor, and the third imaging sensor is a grayscale camera sensor.

17. A camera device comprising:
   at least one projector;
   a first imaging sensor;
   a second imaging sensor separated from the first imaging sensor by a first baseline;
   a third imaging sensor separated from the first imaging sensor by a second baseline, wherein the second baseline is greater than the first baseline; and
   a controller configured to:
      obtain a plurality of images of a scene, the plurality of images comprising (i) a first image captured by the first imaging sensor, (ii) a second image captured by the second imaging sensor, and (iii) a third image captured by the third imaging sensor;
      generate, based on the first image and the second image, a first point cloud comprising first depth information in the scene for a first range of distances from the camera device;
      generate, based on the first image and the third image, a second point cloud comprising second depth information in the scene for a second range of distances from the camera device;
      generate third depth information, based on the first point cloud and the second point cloud; and
      perform one or more robotic operations within the scene, based on the third depth information.

18. The camera device of claim 17, further comprising a housing comprising the at least one projector, the first imaging sensor, the second imaging sensor, and the third imaging sensor.

19. The camera device of claim 17, wherein the camera device is disposed above a transport device within an environment and the transport device is within a field-of-view of each of the first imaging sensor, the second imaging sensor, and the third imaging sensor.

20. The camera device of claim 17, wherein the at least one projector comprises a first projector configured to project a first pattern onto a scene and a second projector configured to project a second pattern onto the scene.

* * * * *